United States Patent
Kameda et al.

(10) Patent No.: US 11,077,403 B2
(45) Date of Patent: Aug. 3, 2021

(54) WATER TREATMENT METHOD

(71) Applicant: KURITA WATER INDUSTRIES LTD., Tokyo (JP)

(72) Inventors: Hidekuni Kameda, Tokyo (JP); Kazuki Ishii, Tokyo (JP); Yaozhen Chen, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 0 days.

(21) Appl. No.: 16/490,161

(22) PCT Filed: Sep. 15, 2017

(86) PCT No.: PCT/JP2017/033548
§ 371 (c)(1),
(2) Date: Aug. 30, 2019

(87) PCT Pub. No.: WO2018/173328
PCT Pub. Date: Sep. 27, 2018

(65) Prior Publication Data
US 2019/0388840 A1 Dec. 26, 2019

(30) Foreign Application Priority Data
Mar. 23, 2017 (JP) .............................. JP2017-057674

(51) Int. Cl.
*B01D 61/04* (2006.01)
*C02F 1/44* (2006.01)
(Continued)

(52) U.S. Cl.
CPC ............. *B01D 61/04* (2013.01); *B01D 21/01* (2013.01); *B03D 3/02* (2013.01); *B03D 3/06* (2013.01);
(Continued)

(58) Field of Classification Search
CPC ........ B01D 61/04; B01D 61/00; B01D 61/02; B01D 21/00; B01D 21/0012; B01D 21/01;
(Continued)

(56) References Cited

U.S. PATENT DOCUMENTS

| | | | |
|---|---|---|---|
| 9,403,704 | B2 | 8/2016 | Ooi et al. |
| 2012/0241377 | A1 | 9/2012 | Ooi et al. |

(Continued)

FOREIGN PATENT DOCUMENTS

| | | |
|---|---|---|
| JP | 2007-7563 A | 1/2007 |
| JP | 2010-017688 A | 1/2010 |

(Continued)

OTHER PUBLICATIONS

PCT/ISA/210, "International Search Report for International Application No. PCT/JP2017/033548," dated Nov. 7, 2017.

(Continued)

*Primary Examiner* — Clare M Perrin
(74) *Attorney, Agent, or Firm* — Manabu Kanesaka

(57) ABSTRACT

A method for treating water, the method including adding, as coagulants, a polymer compound having a phenolic hydroxyl group and an iron-based coagulant to water to be treated, filtering the coagulated water with a clarification filter, and subjecting the filtered water to a reverse osmosis membrane treatment, wherein the addition of the coagulants is controlled such that a ratio between an addition concentration of the polymer compound having a phenolic hydroxyl group and an addition concentration of the iron-based coagulant is constant.

2 Claims, 1 Drawing Sheet

(51) Int. Cl.
*C02F 1/56* (2006.01)
*B01D 21/01* (2006.01)
*B03D 3/02* (2006.01)
*B03D 3/06* (2006.01)
*C02F 1/52* (2006.01)
*C02F 9/00* (2006.01)
*C02F 1/66* (2006.01)
*C02F 1/42* (2006.01)
*C02F 1/76* (2006.01)
*C02F 1/28* (2006.01)

(52) U.S. Cl.
CPC .............. *C02F 1/44* (2013.01); *C02F 1/5245* (2013.01); *C02F 1/56* (2013.01); *B01D 2311/04* (2013.01); *C02F 9/00* (2013.01); *C02F 2301/08* (2013.01); *C02F 2303/22* (2013.01); *C02F 2305/02* (2013.01)

(58) Field of Classification Search
CPC .... B01D 21/02; B01D 21/0027; B01D 21/08; B01D 37/00; B01D 37/03; C02F 1/00; C02F 1/001; C02F 1/44; C02F 1/52; C02F 1/5209; C02F 1/5236; C02F 1/5245; C02F 1/5272; C02F 1/54; C02F 2001/007; C02F 9/00
USPC ....... 210/634, 639, 702, 703, 704, 705, 723, 210/828, 729, 732, 749, 767, 806, 295, 210/500.2
See application file for complete search history.

(56) References Cited

U.S. PATENT DOCUMENTS

| | | |
|---|---|---|
| 2013/0313199 A1* | 11/2013 | Marcin .................. C02F 9/00 210/663 |
| 2014/0346111 A1 | 11/2014 | Oi et al. |
| 2017/0107126 A1 | 4/2017 | Fujii et al. |

FOREIGN PATENT DOCUMENTS

| | | |
|---|---|---|
| JP | 2011-56496 A | 3/2011 |
| JP | 2012-166118 A | 9/2012 |
| JP | 2013-255923 A | 12/2013 |
| JP | 2015-157265 A | 9/2015 |
| JP | 2015-229121 A | 12/2015 |
| JP | 2015229121 A * | 12/2015 |
| JP | 5867532 B2 | 2/2016 |
| WO | 2013/099857 A1 | 7/2013 |

OTHER PUBLICATIONS

Japan Patent Office, "Office Action for Japanese Patent Application No. 2017-057674," dated Nov. 7, 2017.
Taiwan Patent Office, "Office Action for Taiwanese Patent Application No. 106132879," dated Oct. 26, 2020.

* cited by examiner

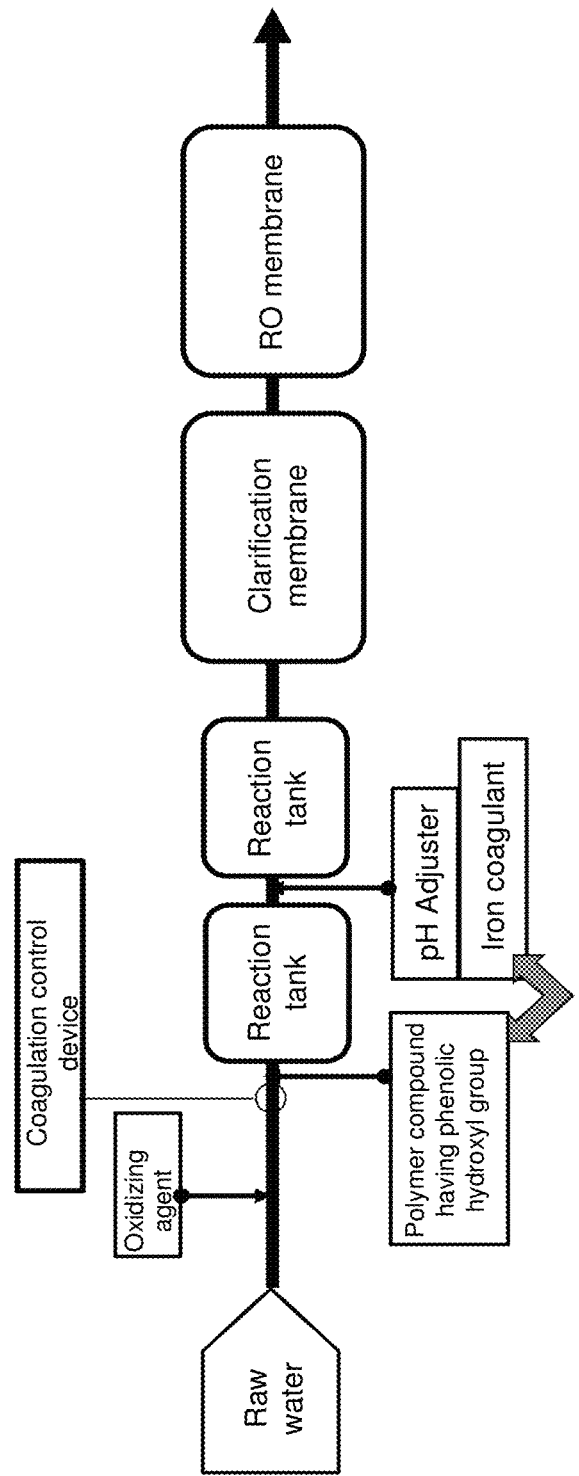

WATER TREATMENT METHOD

TECHNICAL FIELD

The present invention relates to a method for treating water in which raw water is treated by using coagulation, clarification, and a reverse osmosis membrane, and more particularly to a method for treating water using, as coagulants, a polymer compound having a phenolic hydroxyl group and an iron-based coagulant.

BACKGROUND ART

In water treatment using well water, industrial water, tap water, and the like as raw water, a coagulant is added to the raw water to cause suspended matter, colloidal components, organic substances, and the like in raw water to coagulate and clump together. Then, the treatment water is recovered by carrying out a solid-liquid separation process by sedimentation, floatation, filtration, membrane filtration, and the like, or by performing clarification and disinfection by membrane filtration alone.

In the past, a coagulation treatment has been carried out by using inorganic coagulants such as ferric chloride, PAC or the like. However, for coagulation using only iron chloride (ferric chloride), for example, depending on the raw water quality, iron colloids are produced, which can lead to contamination of the clarification membrane.

In order to reduce a UV-260 component, which causes membrane clogging in reverse osmosis (RO) membranes, in the water to be treated, it is necessary to increase the amount of the inorganic coagulant added, and there is the problem of an increased amount of produced sludge. As a guideline, the cleaning frequency of the reverse osmosis membrane is about once every six months. If the cleaning frequency is once within three months, costs increase and there is an increased risk of membrane deterioration due to the cleaning.

To solve this problem, it has been proposed to add a polymer compound having a phenolic hydroxyl group prior to the addition of the inorganic coagulant. By adding a polymer compound having a phenolic hydroxyl group, the amount of inorganic coagulant to be added can be reduced, and the water quality of the coagulation treatment water can be improved (Patent Literature 1).

When a coagulation treatment is performed using a polymer compound having a phenolic hydroxyl group and an inorganic coagulant, a low molecular weight component may remain in the coagulation treatment water and clog the reverse osmosis membrane. In addition, even when the RO treatment is performed after the clarification treatment of the coagulation treatment water with the clarification membrane, when directly treating with the clarification membrane after adding the polymer compound having phenolic hydroxyl group, the polymer compound and the like may adhere to the clarification membrane causing filtration performance to rapidly deteriorate, or may leak from the clarification membrane, thereby clogging the RO membrane.

Patent Literature 2 discloses that low molecular weight component leakage is suppressed by, after adding the polymer compound having a phenolic hydroxyl group and the inorganic coagulant to the water to be treated, adding a cationic polymer coagulant having an intrinsic viscosity of 0.23 dL/g or more. However, newly adding a cationic polymer coagulant means that there are three coagulant agents, and difficulties in terms of costs and control of coagulant addition can also be expected.

Patent Literature 3 and Patent Literature 4 disclose that after adding a novolac-type phenol resin coagulant to the water to be treated, an inorganic coagulant is added, and an RO treatment is performed.

PTL 1: JP 2007-7563 A
PTL 2: JP 2015-157265 A
PTL 3: JP 2011-56496 A
PTL 4: JP 2012-166118 A

SUMMARY OF INVENTION

The present invention is directed to a method for treating water, the method including adding, as coagulants, a polymer compound having a phenolic hydroxyl group and an iron-based coagulant to water to be treated, filtering the coagulated water with a clarification filter, and subjecting the filtered water to a reverse osmosis membrane treatment. It is an object of the present invention, in this method, form a good floc, suppress adherence and contamination on the clarification membrane, and suppress iron leakage and low molecular weight component leakage.

The gist of the present invention is as follows.

[1] A method for treating water, the method including:

adding, as coagulants, a polymer compound having a phenolic hydroxyl group and an iron-based coagulant to water to be treated;

filtering the coagulated water with a clarification filter; and subjecting the filtered water to a reverse osmosis membrane treatment, wherein the addition of the coagulants is controlled such that a ratio between an addition concentration of the polymer compound having a phenolic hydroxyl group and an addition concentration of the iron-based coagulant is constant.

[2] The method for treating water according to [1], wherein the addition of the coagulants is controlled such that the ratio between the addition concentration of the polymer compound having a phenolic hydroxyl group and the addition concentration of the iron-based coagulant is 0.01 to 0.25.

[3] The method for treating water according to [1] or [2], wherein the addition concentration of the iron-based coagulant is varied according to a raw water quality and/or a treated water quality, and the addition amount of the polymer compound having a phenolic hydroxyl group is controlled following the addition concentration of iron-based coagulant such that the addition concentration is constant.

[4] The method for treating water according to any one of [1] to [3], wherein the addition concentration of the polymer compound having a phenolic hydroxyl group is 1 to 15 mg/L.

[5] The method for treating water according to any one of [1] to [4], wherein the coagulated water is directly supplied to the clarification filter.

Advantageous Effects of Invention

In the present invention, in a method for treating water, which method includes adding, as coagulants, a polymer compound having a phenolic hydroxyl group and an iron-based coagulant to water to be treated, filtering the coagulated water with a clarification filter, and subjecting the filtered water to a reverse osmosis membrane treatment, wherein a ratio between an addition concentration of the polymer compound having a phenolic hydroxyl group and an addition concentration of the iron-based coagulant is initially determined, and the amounts of the polymer compound having a phenolic hydroxyl group and the iron-based coagulant added are controlled such that this ratio is constant. As a result, a good floc is formed, adherence and contamination on the clarification membrane is suppressed, and iron leakage and low molecular weight component leakage are suppressed.

BRIEF DESCRIPTION OF DRAWING

FIG. 1 is a flow diagram describing the method of the present invention.

DESCRIPTION OF EMBODIMENTS

In the present invention, as shown in FIG. 1, after optionally adding an oxidizing agent to water to be treated, a polymer compound having a phenolic hydroxyl group and an iron-based coagulant are added, a clarification treatment is then performed, followed by a reverse osmosis membrane treatment (hereinafter sometimes referred to as RO treatment).

Examples of the water to be treated include tap water, industrial water, well water, and the like. Examples of the industrial water include river water, lake and marsh water, and the like. In the present invention, it is preferable that the water to be treated has a TOC concentration of about 0.1 to 5.0 mg/L.

The polymer compound having a phenolic hydroxyl group that is used is a reaction product obtained by carrying out a resol-type secondary reaction on a novolac-type phenol resin, and is in the form of an alkaline solution. The polymer compounds having a phenolic hydroxyl group described in Patent Literature 3 and Patent Literature 4 are preferred.

The polymer compound having a phenolic hydroxyl group is a water treatment coagulant composed of an alkaline solution of a phenolic resin obtained by performing a resol-type secondary reaction by adding an aldehyde to an alkaline solution of a novolac-type phenolic resin obtained by reacting a phenol and an aldehyde in the presence of an acid catalyst. The phenol preferably includes a methylphenol.

The novolac-type phenolic resin, which serves as a raw material of the resol-type secondary reaction, is produced by subjecting a phenol and an aldehyde to an addition condensation reaction in the presence of an acid catalyst in a reaction kettle according to an ordinary method, and then under normal pressure and reduced pressure, performing dehydration and removal of unreacted phenols.

Examples of the aldehyde include, but are not limited to, formaldehyde, paraformaldehyde, acetaldehyde, propylaldehyde, benzaldehyde, salicylaldehyde, glyoxal, and the like. These aldehydes may be used singly or in a mixture of two or more.

Among these, practical substances are formaldehyde and paraformaldehyde.

Although there is no limitation on the melting point of the novolac-type methylphenolic resin serving as a raw material of the resol-type secondary reaction, usually, the melting point of a novolac-type methylphenolic resin obtained from a raw material phenol mainly composed of a methylphenol such as cresol is 60 to 135° C.

Although there is no limitation on the molecular weight of novolac-type methylphenolic resin serving as a raw material of the resol-type secondary reaction, a resin with a higher molecular weight is preferable. As a resin with a higher molecular weight contains a small amount of low molecular weight components, when a resin with a higher molecular weight is used, low molecular weight components remain in a small amount after the completion of the secondary reaction. The low molecular weight components does not only participate in coagulation, but also contaminate the coagulation treated water. Therefore, the novolac-type methylphenolic resin to be used preferably has a weight average molecular weight of 1000 or more, and particularly preferably 2000 or more. The upper limit of the molecular weight of the novolac-type methylphenolic resin is not limited, but is usually about 8000 in terms of weight average molecular weight.

The weight average molecular weight of the secondary reaction methylphenolic resin is preferably 5,000 or more, and more preferably 10000 or more. On the other hand, when the weight average molecular weight exceeds 50000, some molecules having a molecular weight of 1,000,000 or more are produced, the viscosity is high, there is further cross-linking over time, and there is a high likelihood of insoluble matter being produced. For those reasons, the weight average molecular weight of the secondary reaction methylphenolic resin is preferably 50000 or less, and particularly preferably 30000 or less.

The alkaline solution of methylphenolic resin obtained by the resol-type secondary reaction is a pumpable liquid. A commercially available product (e.g., Kuriverter BP-201, manufactured by Kurita Water Industries Ltd.) can be used.

As the iron-based coagulant, ferric chloride, ferric sulfate, polyferric sulfate, and the like can be used.

In the present invention, it is preferable that the addition concentration of the iron-based coagulant be varied according to the raw water quality (e.g., TOC concentration) and/or the treated water quality (e.g., TOC concentration), and the amount of the polymer compound having a phenolic hydroxyl group added be controlled following the addition concentration of the iron-based coagulant such that the addition concentration is constant. For example, when the TOC concentration varies in the range of 0.1 to 5.0 mg/L, iron-based coagulant is controlled in the range of 5 to 300 mg/L. Specifically, for a TOC concentration of 0.1 mg/L, 5 to 50 mg/L (preferably 10 to 30 mg/L) of the iron-based coagulant is added, for a TOC concentration of 2 mg/L, 40 to 120 mg/L (preferably 50 to 100 mg/L) of the iron-based coagulant is added, and for a TOC concentration of 5 mg/L, about 150 to 300 mg/L (preferably 200 to 250 mg/L) of the iron-based coagulant is added. Note that these numerical values are not limited to these ranges, and are suitably changed while looking at the treated water quality and operating conditions.

It is preferable that the polymer compound having a phenolic hydroxyl group be added such that a ratio of [addition concentration of polymer compound having a phenolic hydroxyl group]/[addition concentration of iron-based coagulant] (hereinafter sometimes referred to as coagulant ratio) is a constant value, particularly a constant value selected between 0.01 and 0.25, and especially between 0.01 to 0.2.

The polymer compound having a phenolic hydroxyl group is preferably added so that the addition concentration is 20 mg/L or less. The coagulation reaction time after the addition of each coagulant is, respectively, about 1 to 30 minutes, and preferably about 4 to 15 minutes. Regarding the addition order, either the polymer compound having a phenolic hydroxyl group or the iron-based coagulant may be added first, but it is desirable to add the polymer compound having a phenolic hydroxyl group first.

The coagulation pH is preferably 4.5 to 6, and particularly preferably 5 to 5.5. If the pH is less than 4.5, there may be reverse osmosis membrane clogging due to iron leakage. If the pH is more than 6, the coagulation may be poor.

When $Fe^{2+}$ ions are present in the water to be treated, because the presence of such ions clogs the RO membrane, an oxidizing agent (preferably a chlorine-based oxidizing agent such as sodium hypochlorite) may be added to the water to be treated before the coagulant is added in order to facilitate conversion of the $Fe^{2+}$ ions into $Fe^{3+}$ ion and removal by the coagulation and clarification treatments. This addition concentration is preferably about 0.3 to 1.0 mg/L as $Cl_2$.

The coagulated water is preferably subjected to the clarification treatment without pretreatment. As the clarification device, a general gravity filter, a pressure filter, or a clarification membrane can be used. From the viewpoint of chemical resistance, the clarification membrane is preferably made of PVDF, and a UF membrane, MF membrane or the like having a pore size of 0.02 to 0.1 μm is preferable. The clarification membrane device may be a cross-flow type or a total quantity filtration type.

The clarification treatment using a clarification membrane device is carried out employing the steps of passing water through the clarification membrane, bubbling air, backwashing, and filling with water. The filtration water-flowing time is preferably about 20 to 40 minutes. The differential pressure (inlet pressure-outlet pressure) is preferably about 0.02 to 0.04 MPa. If the differential pressure rises to 0.07 to 0.10 MPa, stationary cleaning is carried out.

The preferred conditions when subjecting the clarification treatment water to the reverse osmosis membrane treatment are as follows.
(1) The amount of brine is preferably 3.6 m³/h or more.
(2) The reverse osmosis membrane is preferably an ultra-low pressure membrane with a standard pressure of 0.735 MPa. The membrane area is preferably 35 to 41 m².
(3) The initial pure water flux is preferably 1.0 m/d or more (25° C., 0.735 MPa). The initial desalting rate is preferably 98% or more.
(4) The recovery rate is preferably set such that the calcium hardness Langelier index is 0 or less. Further, the recovery rate is preferably set such that the silica concentration in the brine water is within the degree of solubility of silica. The recovery rate is preferably 50 to 80%.

The RO treatment water may be further subjected to a deionization treatment by an electrodeionization device or an ion exchanger. If there is a possibility of residual chlorine leaking from the RO, it is preferable to provide an activated carbon filter or a safety filter at a stage prior to those devices.

EXAMPLES

Experimental Examples 1 to 6

Well water was subjected to a coagulation treatment at various coagulant ratios, then filtered and tested for coagulation effect.

Kuriverter BP-201 (resol-type) manufactured by Kurita Water Industries Ltd. was used as the polymer compound having a phenolic hydroxyl group. Ferric chloride (iron chloride) was used as the iron-based coagulant.

The well water had a UV-260 of 0.221 mg/L and a TOC of 1.0 mg/L.

The coagulation treatment was performed at pH 5.5 using a jar tester.

The coagulant ratios were 0, 0.01, 0.1, 0.2, 0.5, and 1, as shown in Table 1.

Filtration was carried out using No. 5A filter paper. The filtered water quality (UV-260, TOC) was measured, and the results are shown in Table 1.

TABLE 1

| | Experimental Example 1 | Experimental Example 2 | Experimental Example 3 | Experimental Example 4 | Experimental Example 5 | Experimental Example 6 |
|---|---|---|---|---|---|---|
| Ferric chloride concentration (mg/L) | 50 | 50 | 50 | 50 | 50 | 50 |
| Polymer compound having phenolic hydroxyl group (Kuriverter BP-201) (mg/L) | 0 | 0.5 | 5 | 10 | 25 | 50 |
| Coagulant ratio (—) | 0 | 0.01 | 0.1 | 0.2 | 0.5 | 1 |
| Treatment water TOC (mg/L) | 0.53 | 0.47 | 0.48 | 0.47 | 0.51 | 0.68 |
| Treatment water UV-260 (mg/L) | 0.046 | 0.039 | 0.043 | 0.039 | 0.041 | 0.051 |

Discussion

As shown in Table 1, Experimental Examples 2 to 5, in which the coagulant ratio was 0.01 to 0.5, had a lower TOC concentration than the Experimental Example 1, in which the coagulant ratio was 0.

Experimental Example 6, in which the coagulant ratio was 1, had a higher TOC than Experimental Example 1. This is thought to be because a part of the low molecular weight components (impurities) in the polymer compound having a phenolic hydroxyl group leaked.

Examples 1 and 2 and Comparative Examples 1 and 2

Experimental Conditions

A polymer compound having a phenolic hydroxyl group (Kuriverter BP-201 (resol-type)) was added in the amount added shown in Table 2 to raw water (water from the town of Nogi, Tochigi Prefecture, Japan: TOC 0.9 mg/L), and then ferric chloride was added in the amount added shown in Table 2. Then, the water was filtered through a clarification membrane having a pore size of 0.02 μm and subjected to an RO treatment. The RO treatment conditions were as follows.

RO Treatment Conditions

Amount of treatment water 3.8 L/min

Amount of circulating water 15 L/min

Recovery rate 65%

The addition concentration of the polymer compound having a phenolic hydroxyl group (Kuriverter BP-201 (resol-type)) was set to be approximately 16% of the ferric chloride (coagulant ratio ((polymer compound having a phenolic hydroxyl group/iron-based coagulant)=approximately 0.16)). The coagulation pH was adjusted to 5.5.

Water was flowed for 2 weeks, and the differential pressure of the clarification membrane and the flux behavior (flux depression coefficient) of the RD membrane were evaluated. The results are shown in Table 2. From the viewpoint of cleaning frequency and the cleaning recovery, the flux depression coefficient was set to be permissible value of 0.030 or less. The flux depression coefficient is the value of m in $F = F_0 \times T$.

F: Flux $F_0$: Initial flux

T: Time m: Flux depression coefficient

TABLE 2

|  | Example 1 | Example 2 | Comparative Example 1 | Comparative Example 2 |
|---|---|---|---|---|
| Ferric chloride concentration (mg/L) | 50 | 120 | 150 | 300 |
| Polymer compound having phenolic hydroxyl group (mg/L) | 8 | 20 | 25 | 50 |
| Coagulant ratio (—) | 0.16 | 0.16 | 0.17 | 0.17 |
| Rate of increase in differential pressure (MPa/d) | <$10^{-5}$ | <$10^{-5}$ | <$10^{-5}$ | $3 \times 10^{-5}$ |
| Flux depression coefficient (m) (—) | <0.010 | <0.010 | 0.029 | 0.050 |

Discussion

As shown in Table 2, it was found that even if the coagulant ratio is the same, an increase in the addition concentration of the polymer compound having a phenolic hydroxyl group causes an increase in the differential pressure or a decrease in the flux. This is considered to be due to an increase in the differential pressure as a result of adhesion to the clarification membrane, and a part of the low molecular weight components in the polymer compound having a phenolic hydroxyl group leaking in the RO, thereby causing membrane clogging.

Examples 3 to 6 and Comparative Examples 3 to 6

In Example 1, the RO treatment operation was carried out by adding Canadian Fulvic Acid and setting the TOC to the conditions shown in Table 3. At that time, the treatment was carried out under conditions in which the coagulant ratio between the polymer compound having a phenolic hydroxyl group and the iron-based coagulant was fixed at 0.16 (Examples 3 to 6), or in which the concentration of the iron-based coagulant was varied and the concentration of the polymer compound having a phenolic hydroxyl group was fixed (Comparative Examples 3 to 6). Note that the addition of the Canadian Fulvic Acid was performed once a week, and water was flowed for 1 week, and the differential pressure of the clarification membrane and the flux behavior (flux depression coefficient) of the RO membrane were evaluated. The results are shown in Table 3. It is also noted that when adding the TOC, the operation of the RO membrane was temporarily stopped. Each flux depression coefficient was calculated by taking the flux before adding the TOC to be the initial flux.

TABLE 3

|  | Example 3 | Example 4 | Example 5 | Example 6 | Comparative Example 3 | Comparative Example 4 | Comparative Example 5 | Comparative Example 6 |
|---|---|---|---|---|---|---|---|---|
| TOC mg/L | 0.9 | 1 | 2 | 3 | 0.9 | 1 | 2 | 3 |
| Ferric chloride concentration (mg/L) | 50 | 50 | 75 | 100 | 50 | 50 | 75 | 100 |
| Polymer compound having phenolic hydroxyl group (mg/L) | 8 | 8 | 12 | 16 | 8 | 12 | 12 | 12 |
| Coagulant ratio (—) | 0.16 | 0.16 | 0.16 | 0.16 | 0.16 | 0.24 | 0.16 | 0.12 |
| Rate of increase in differential pressure (MPa/d) | <$10^{-5}$ | <$10^{-5}$ | <$10^{-5}$ | <$10^{-5}$ | <$10^{-5}$ | <$10^{-5}$ | <$10^{-5}$ | <$10^{-5}$ |
| Flux depression coefficient (m) (—) | <0.010 | <0.010 | <0.010 | <0.010 | <0.010 | <0.014 | <0.011 | <0.012 |

Discussion

The total amount of each of the iron-based coagulant and the polymer compound having a phenolic hydroxyl group added was the same in Examples 3 to 6 and Comparative Examples 3 to 6. Each of the amounts of the coagulants added was in an appropriate range.

From Table 3, in the Examples in which the coagulant ratio was fixed, no increase in differential pressure and no change in the flux depression coefficient were observed. In addition, the differential pressure of the clarification membrane did not change when the coagulant ratio was fixed or when the amount of the polymer compound having a phenolic hydroxyl group added was fixed. This is considered to be due to the fact that adhesion to the clarification membrane was suppressed.

On the other hand, in the Comparative Examples, the flux depression coefficient of the RO tended to decrease more than for the Examples.

This is thought to be due to a poor ability to track the addition effect of the ferric chloride with respect to changes in the amount of the polymer compound having a phenolic hydroxyl group added, despite the coagulant ratio and the addition concentration being in the appropriate ranges (Table 1 and Table 2). As a result, it is thought that when the coagulant ratio was changed to 0.24 in the Comparative Examples, the low molecular weight component leaked in the RO from the polymer compound having a phenolic hydroxyl group, and when the coagulant ratio was changed to 0.12, the iron ions and the TOC component tended to leak in the RO, and the flux depression coefficient tended to decrease more.

In the Experimental Examples, the Examples, and the Comparative Examples, the addition of the coagulants is controlled using TOC as an index, but a measurement value of UV-260, the iron ion concentration, turbidity, or the like may also be used as a control index. In addition, a system implementing the treatment method of the present invention may be constructed by providing a control unit that performs automatic dosing control based on measurement values from sensors provided in the raw water and the treatment water.

Although the invention has been described in detail with reference to specific embodiments, it will be apparent to those skilled in the art that various modifications can be made without departing from the spirit and scope of the invention.

This application is based on Japanese Patent Application No. 2017-057674 filed on Mar. 23, 2017, which is hereby incorporated by reference in its entirety.

The invention claimed is:

1. A method for treating water, the method comprising:
    adding, as coagulants, a polymer compound having a phenolic hydroxyl group and an iron-based coagulant to water to be treated;
    filtering coagulated water with a clarification filter; and
    subjecting filtered water to a reverse osmosis membrane treatment,
    wherein the addition of the coagulants is controlled such that a ratio between an addition concentration of the polymer compound having the phenolic hydroxyl group and an addition concentration of the iron-based coagulant is constant and is 0.01 to 0.25,
    the addition concentration of the polymer compound having the phenolic hydroxyl group is 1 to 15 mg/L,
    the addition concentration of the iron-based coagulant is controlled according to a TOC concentration of the treated water, and the polymer compound having the phenolic hydroxyl group is added following the addition concentration of the iron-based coagulant, and
    the addition concentration of the iron-based coagulant is between 5 and 300 mg/L when the TOC concentration varies in a range between 0.1 and 5.0 mg/L.

2. The method for treating water according to claim 1, wherein the addition concentration of the iron-based coagulant is between 5 and 50 mg/L when the TOC concentration is 0.1 mg/L, the addition concentration of the iron-based coagulant is between 40 and 120 mg/L when the TOC concentration is 2 mg/L, and the addition concentration of the iron-based coagulant is between 150 and 300 mg/L when the TOC concentration is 5 mg/L.

* * * * *